United States Patent
Khamis et al.

(10) Patent No.: US 12,115,874 B2
(45) Date of Patent: Oct. 15, 2024

(54) DYNAMIC MULTIPLE BI-DIRECTIONAL SUPPLY AND DEMAND MATCHING FOR EV CHARGING

(71) Applicant: GM GLOBAL TECHNOLOGY OPERATIONS LLC, Detroit, MI (US)

(72) Inventors: Alaa M. Khamis, Courtice (CA); Roddi L. MacInnes, Bowmanville (CA); Vyacheslav Berezin, Newmarket (CA)

(73) Assignee: GM Global Technology Operations LLC, Detroit, MI (US)

( * ) Notice: Subject to any disclaimer, the term of this patent is extended or adjusted under 35 U.S.C. 154(b) by 218 days.

(21) Appl. No.: 17/888,580

(22) Filed: Aug. 16, 2022

(65) Prior Publication Data
US 2024/0059170 A1 Feb. 22, 2024

(51) Int. Cl.
*G06F 17/00* (2019.01)
*B60L 53/62* (2019.01)
(Continued)

(52) U.S. Cl.
CPC .............. *B60L 53/62* (2019.02); *B60L 53/63* (2019.02); *B60L 53/68* (2019.02); *B60L 58/12* (2019.02);
(Continued)

(58) Field of Classification Search
CPC .......... B60L 53/62; B60L 53/63; B60L 53/68; B60L 58/12; B60L 58/16; G01C 21/3811;
(Continued)

(56) References Cited

U.S. PATENT DOCUMENTS

| | | | | |
|---|---|---|---|---|
| 8,352,112 B2 * | 1/2013 | Mudalige | ................. | G08G 1/22 |
| | | | | 342/458 |
| 11,479,142 B1 * | 10/2022 | Govan | .................. | B60W 50/14 |

(Continued)

OTHER PUBLICATIONS

Bourass, Intelligent Route Guidance for Electric Vehicles in the Smart Grid, IEEE, 2017 (Year: 2017).*

(Continued)

*Primary Examiner* — Matthew Ell
*Assistant Examiner* — Matthew J Ludwig
(74) *Attorney, Agent, or Firm* — Quinn IP Law (57) ABSTRACT

A method for dynamically matching energy demand of a population of electric vehicles (EVs) with energy supply of a population of charging stations within a geofenced perimeter includes receiving, via a cloud-based server, EV information from each respective EV, and receiving charging station information from each respective charging station. The method includes generating an SoC map and a charging station power map from the EV information and the charging station information, respectively, and predicting the energy supply and demand using the maps. The server dynamically matches the EVs to at least one of the charging stations or vice versa using a reward function, the predicted energy supply, and the predicted energy demand, including generating a rank-ordered listing for each of the EVs and/or each of the charging stations in a manner that maximizes an expected discounted future reward.

20 Claims, 4 Drawing Sheets

(51) Int. Cl.
  *B60L 53/63* (2019.01)
  *B60L 53/68* (2019.01)
  *B60L 58/12* (2019.01)
  *B60L 58/16* (2019.01)
  *B60L 58/24* (2019.01)
  *G01C 21/00* (2006.01)
  *G06Q 10/04* (2023.01)
  *G06Q 30/0202* (2023.01)
  *G06Q 30/0235* (2023.01)

(52) U.S. Cl.
  CPC .............. *B60L 58/16* (2019.02); *B60L 58/24* (2019.02); *G01C 21/3811* (2020.08); *G06Q 10/04* (2013.01); *G06Q 30/0202* (2013.01); *G06Q 30/0235* (2013.01)

(58) Field of Classification Search
  CPC . G06Q 10/04; G06Q 30/0202; G06Q 30/0235
  USPC ........................................................ 701/438
  See application file for complete search history.

(56) References Cited

U.S. PATENT DOCUMENTS

| | | | | |
|---|---|---|---|---|
| 2012/0109519 | A1* | 5/2012 | Uyeki | B60L 53/68 701/426 |
| 2014/0032034 | A1* | 1/2014 | Raptopoulos | G05D 1/0088 701/25 |
| 2014/0149153 | A1* | 5/2014 | Cassandras | G08G 1/144 705/5 |
| 2015/0039391 | A1* | 2/2015 | Hershkovitz | G01R 31/382 705/7.31 |
| 2015/0294228 | A1* | 10/2015 | Saito | G06Q 50/06 706/48 |
| 2019/0056737 | A1* | 2/2019 | Palanisamy | B60W 30/16 |
| 2020/0376972 | A1* | 12/2020 | Martin | B60L 53/57 |
| 2021/0065073 | A1* | 3/2021 | Maeda | H04L 67/52 |
| 2022/0082397 | A1* | 3/2022 | Zhang | G01C 21/3476 |
| 2022/0089056 | A1* | 3/2022 | Rajmohan | B60L 53/66 |
| 2023/0012166 | A1* | 1/2023 | Disley | B60L 53/68 |
| 2023/0024900 | A1* | 1/2023 | Ayoola | B60L 55/00 |
| 2023/0063075 | A1* | 3/2023 | Misra | G06Q 30/0206 |

OTHER PUBLICATIONS

Lee, Deep Reinforcement Learning Based Optimal Route and Charging Station Selection, Energies 2020 (Year: 2020).*

Baouche, 'Efficient Allocation of Electric Vehicles Charging Stations', IEEE 2014 (Year: 2014).*

* cited by examiner

| EV | CS | ETA (min) | ETC (min) | ECC ($) |
|---|---|---|---|---|
| EV-1 | CS-1 | 14 | 25 | 40 |
|  | CS-3 | 20 | 24 | 30 |
|  | CS-5 | 7 | 50 | 27 |
| EV-2 | CS-4 | 5 | 45 | 35 |
|  | CS-6 | 12 | 38 | 45 |
|  | CS-3 | 17 | 32 | 25 |
| .... |  |  |  |  |
| EV-n | CS-5 | 6 | 33 | 29 |
|  | CS-2 | 10 | 39 | 37 |

| CS | EVs | ETA (min) | ETC (min) | EEC (kWh) | SCP ($) |
|---|---|---|---|---|---|
| CS-1 | EV-1 | 14 | 25 | 25 | 14.5 |
|  | EV-6 | 12 | 22 | 23 | 10.0 |
| CS-2 | EV-5 | 1 | 10 | 21 | 7.8 |
|  | EV-3 | 49 | 8 | 15 | 5.3 |
| .... |  |  |  |  |  |
| CS-m | EV-4 | 35 | 24 | 24 | 11.5 |
|  | EV-2 | 10 | 39 | 22 | 8.9 |

DYNAMIC MULTIPLE BI-DIRECTIONAL SUPPLY AND DEMAND MATCHING FOR EV CHARGING

INTRODUCTION

Electrochemical battery cells and battery packs constructed from such battery cells are used as direct current (DC) power supplies in a myriad of high-power battery electric systems. An electric vehicle is an exemplary type of battery electric system using a high-voltage propulsion battery pack constructed from an application-suitable number of cylindrical, prismatic, or pouch-style battery cells. The battery pack, which is connected to a DC voltage bus, ultimately powers one or more electric propulsion motors and associated power electronic components during battery discharging modes. During battery charging modes, a charging current is provided to the constituent battery cells of the battery pack from an offboard charging station. Thus, the charging process, when performed away from a user's home charging station, often entails locating an available charging station and scheduling a charging time.

While charging infrastructure continues to grow and evolve, drivers of electric vehicles face potential uncertainty regarding actual availability of a given charging station at a particular desired location or charging time. In order to reduce range anxiety, a driver may use an application ("app") to help locate charging stations along a planned travel route, and to schedule a charging session at intervals along the way. However, existing "one-to-one" approaches for scheduling charging sessions, i.e., one electric vehicle seeking an open charging slot at a given charging station, may be suboptimal in terms of balancing energy supply and demand over a wider geographical area.

SUMMARY

Disclosed herein are cloud-based methods and systems for performing dynamic optimal matching of electric vehicle ("EV") charging demand ("EV demand") with electric vehicle supply equipment (EVSE) charging supply levels ("EVSE supply") within a geofenced area of interest ("AOI"). In particular, the computer-implemented solutions described in detail below provide for optimized bidirectional matching of multiple EV demands with available EVSE supplies within the geofenced AOI. Using the disclosed cloud modeling strategies, for instance, a driver of an EV may benefit from dynamic supply prediction over many different charging stations, and dynamic demand prediction over many different EVs. Dynamic bidirectional matching of multiple charging stations to multiple demands ("many-to-many") as opposed to the aforementioned "one-to-one" matching is likewise enabled using a reinforced learning approach, e.g., using a state-of-charge (SoC) map and a charging station power map in a possible embodiment. The present teachings may enable a recommendation engine and automatic enabler for charging spot bookings, pre-conditioning activation, adaptive routing, charging station scheduling, load balancing, power sharing, and dynamic pricing, among other possible attendant benefits.

In a possible implementation, a method for dynamically matching an energy demand of a population of EVs with an energy supply of a population of charging stations within a geofenced perimeter includes receiving, via a cloud-based server, a set of EV information from each respective one of the EVs, and receiving, via the cloud-based server, a set of charging station information from each respective one of the charging stations. The method further includes generating a state of charge (SoC) map and a charging station power map from the set of EV information and the set of charging station information, respectively, via the cloud-based server. In this embodiment, the method also includes predicting the energy supply and the energy demand as a predicted energy supply and a predicted energy demand, respectively, via the cloud-based server using the SoC map and the charging station power map. The EVs are then dynamically matched to at least one of the charging stations using a reward function, the predicted energy supply, and the predicted energy demand, including generating a rank-ordered listing for each respective one of the EVs and/or each respective one of the charging stations in a manner that maximizes an expected discounted future reward.

The geofenced perimeter may be a dynamically-adjustable polygon, with the method including using a pointer network to define the geofenced perimeter as a convex hull or minimum convex polygon.

Dynamically matching the EVs to at least one of the charging stations may include generating a table of ranked bidirectional matches, the table having a plurality of rewards including an estimated time of arrival (ETA) and an estimated time to charge (ETC) at a respective one of the charging stations. The plurality of rewards may include one or more of an estimated cost of charge (ECC), an estimated expected charge (ECC), or an estimated charging station profit (SCP).

In some aspects of the disclosure, dynamically matching the EVs to at least one of the charging stations includes calculating a combined reward value as a weighted function of the rewards, and maximizing the combined reward value across an area defined by the geofenced perimeter, e.g., using Pareto optimization. Dynamically matching the EVs to at least one of the charging stations may alternatively include performing a temporal difference (TD) model-free on-policy learning algorithm, e.g., Advantage Actor-Critic (A3C).

An aspect of the disclosure includes receiving, via the cloud-based server, contextual information characterizing or describing a vehicle type, a battery temperature, a battery age, a charging type, and local weather conditions for each respective one of the EVs, and a charging type and local weather conditions for each respective one of the charging stations.

Also disclosed herein is a cloud-based server having a processor and a computer-readable storage medium on which is recorded instructions executable by the processor. Execution of the instructions causes the processor to dynamically match an energy demand of a population of EVs with an energy supply of a population of charging stations within a geofenced perimeter by receiving a set of EV information from each respective one of the EVs, and receiving a set of charging station information from each respective one of the charging stations. generating a state of charge (SoC) map and a charging station power map from the set of EV information and the set of charging station information, respectively.

Additionally, execution of the instructions causes the processor to predict the energy supply and the energy demand as a predicted energy supply and a predicted energy demand, respectively, via the cloud-based server using the SOC map and the charging station power map, and to dynamically match the EVs to at least one of the charging stations using a reward function, the predicted energy supply, and the predicted energy demand. This includes generating a rank-ordered listing for each respective one of the EVs and/or each respective one of the charging stations in a manner that maximizes an expected discounted future reward.

Another aspect of the disclosure includes a method for dynamically matching the energy demand of the population of EVs with an energy supply of the population of charging stations within a geofenced perimeter. This embodiment of the method includes receiving, via a cloud-based server, a set of EV information from each respective one of the EVs, and receiving, via the cloud-based server, a set of charging station information from each respective one of the charging stations. The method further includes using a pointer network to define the geofenced perimeter as a dynamically-adjustable polygon, e.g., as a convex hull or minimum convex polygon, generating an SoC map and a charging station power map from the set of EV information and the set of charging station information, respectively, via the cloud-based server, and predicting the energy supply and the energy demand as a predicted energy supply and a predicted energy demand, respectively, via the cloud-based server using the SoC map and the charging station power map.

Additionally, the method in this embodiment includes dynamically matching the EVs to at least one of the charging stations using a reward function, the predicted energy supply, and the predicted energy demand, including generating a rank-ordered listing for each respective one of the EVs and/or each respective one of the charging stations as a table of ranked bidirectional matches in a manner that maximizes an expected discounted future reward, the table having a plurality of rewards including an estimated time of arrival (ETA) and an estimated time to charge (ETC) at a respective one of the charging stations and one or more of an estimated cost of charge (ECC), an estimated expected charge (ECC), or an estimated charging station profit (SCP).

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

The appended drawings are not necessarily to scale, and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Figure 1:
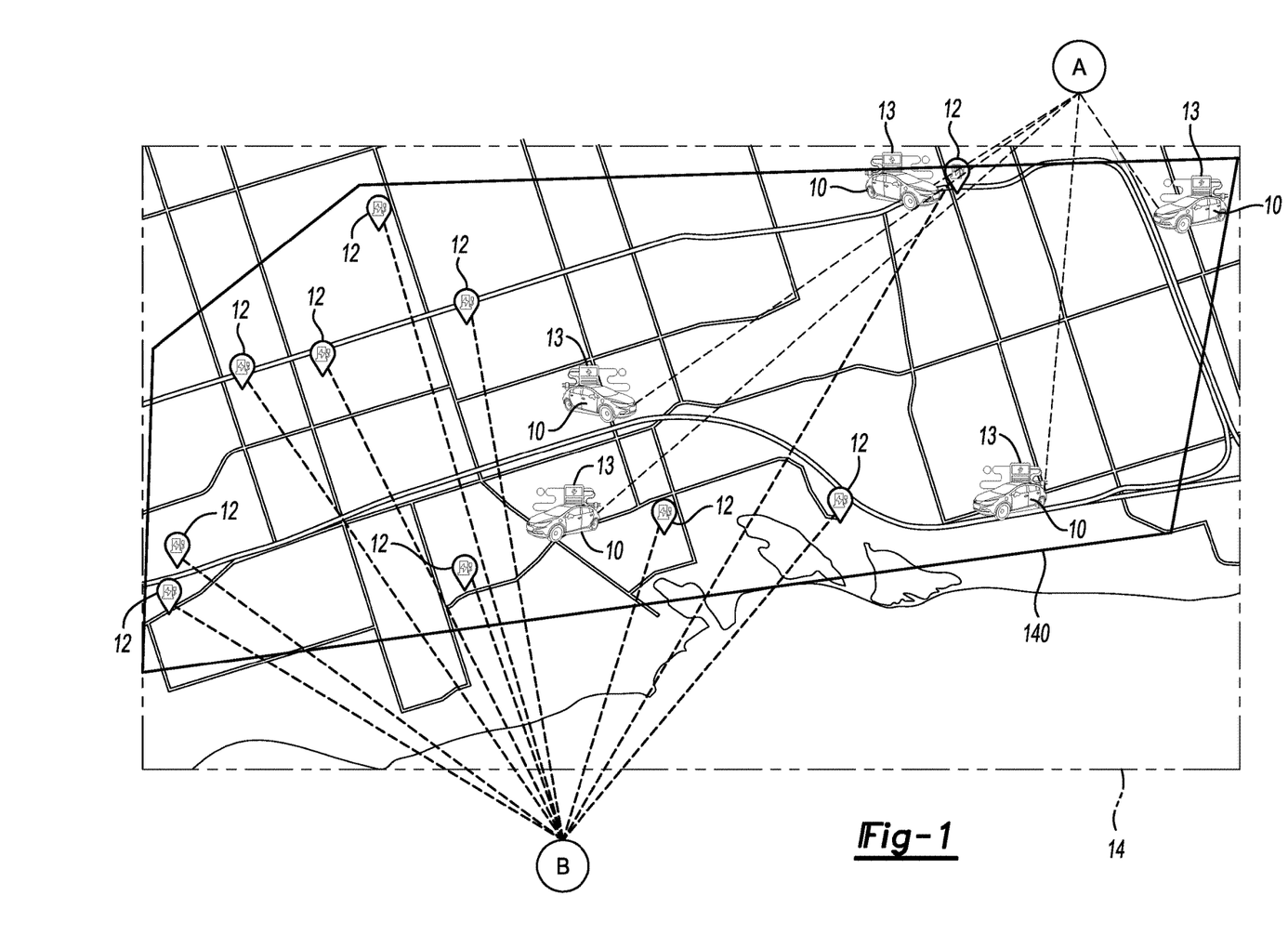
FIG. 1 illustrates a geofenced area of interest including a plurality of electric vehicles (EVs) and electric vehicle supply equipment (EVSE) charging stations, and a cloud-based server in communication with the EVs and EVSE charging stations in accordance with the disclosure.

Referring to the drawings, wherein like reference numbers refer to like features throughout the several views, FIG. 1 depicts a plurality of electrified vehicle (EVs) 10, collectively indicated as EVs (A), and a plurality of offboard electric vehicle supply equipment (EVSE) charging stations 12, collectively indicated as charging stations (B). Each respective EV 10 is in remote communication with a cloud-based server (CS) 50 (see FIG. 2), e.g., via an onboard telematic system 11, and is thus configured to participate in a cloud-based energy supply and demand matching methodology in accordance with the disclosure. Such matching occurs within a geofenced perimeter, which in turn may be (i) a fixed static geofenced perimeter 14 or an elastic and dynamically-adjustable geofenced perimeter 140. Use of the cloud-based server 50 of FIG. 2, e.g., through a software application ("app") or a web-based tool, allows various users to optimally match a charging demand of a plurality of the EVs 10 with available power supplies of a plurality of charging stations 12 located within the geofenced perimeter 14, 140.

As appreciated in the art, energy supply and demand are not static parameters in the context of day-to-day vehicular operations. Rather, supply and demand vary in real-time based on factors such as time of day and the particular number of EVs 10 requiring use of a given charging station 12. The present strategy thus relies on two-way communication between the cloud-based server 50 and the various EVs 10 and charging stations 12 to optimally match supply and demand in real time. Applicable boundary constraints may be applied to effectively limit consideration and computing resources to evaluation of an area defined by the geofenced perimeter 14, 140.

Figure 2:
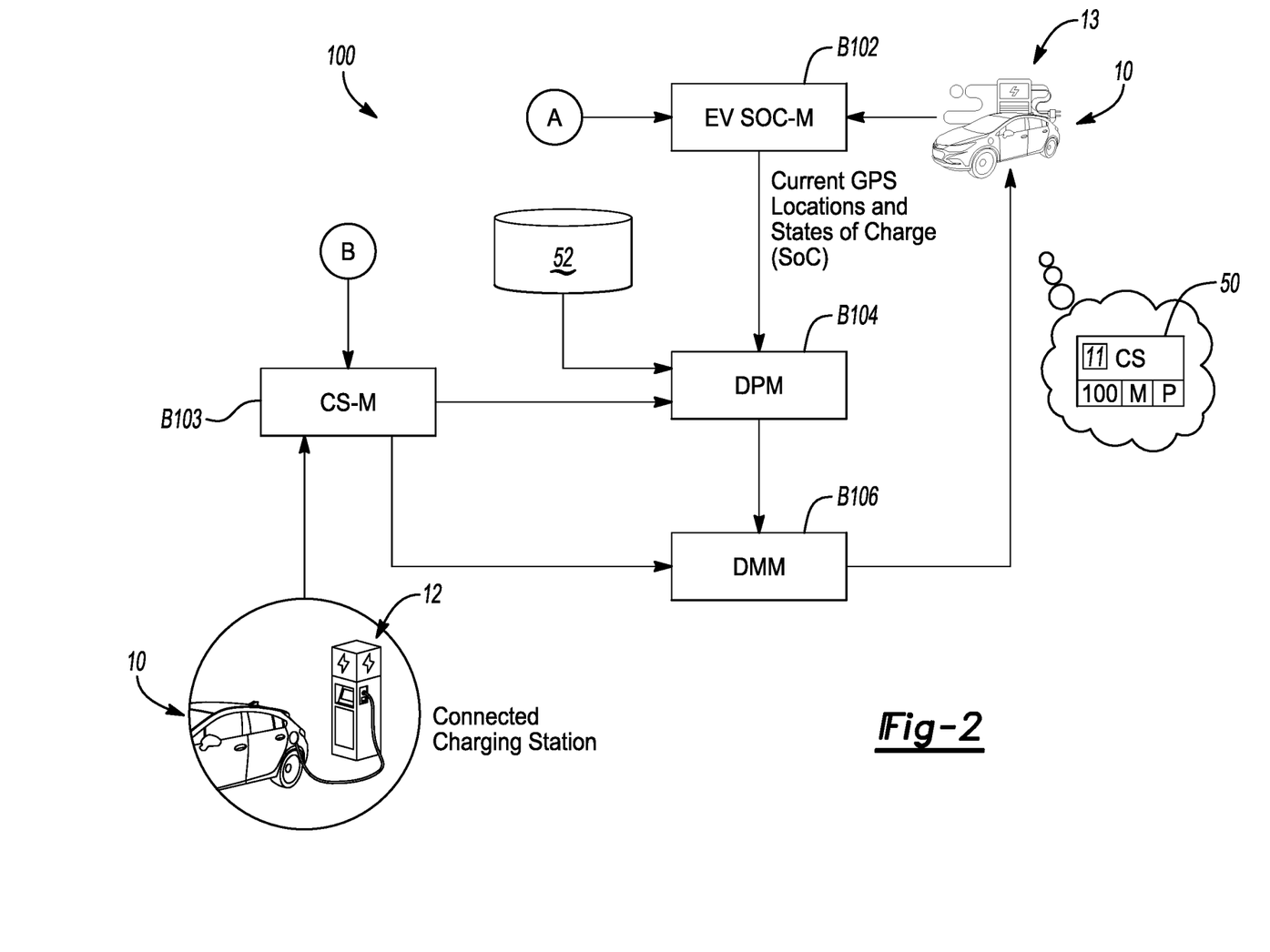
FIG. 2 is a flow chart describing a computer-implementable method for dynamic matching of energy supply and demand in the geofenced area of interest of FIG. 1.

As part of the present methodology, the various EVs 10 located within the geofenced perimeter 14, 140 provide signal inputs to the cloud-based server 50 of FIG. 2 in the form of telematics data, including for example the present location of the EV 10 and a present state of charge (SoC) of a resident battery pack 13. Other inputs to the cloud-based server 50 include information from infrastructure partners within the geofenced perimeter 14, 140, principally the availability and locations of the various charging stations 12, charging capacity of each respective one of the charging stations 12 in terms of available charging power, charging connector types such as SAE J1772, CCS, CHAdeMO, etc., and scheduling information indicative of current and future charging spot availability.

In the performance of the present method, the cloud-based server 50 shown in FIG. 2 includes one or more electronic control units equipped with one or more processors (P), e.g., logic circuits, combinational logic circuit(s), application specific integrated circuit(s), electronic circuit(s), central processing unit(s), semiconductor IC devices, etc., as well as input/output circuit(s), appropriate signal conditioning and buffer circuitry, and other components such as a high-speed clock to provide the described functionality. The cloud-based server 50 also includes an associated tangible computer-readable storage medium, collectively referred to as memory (M) for simplicity, inclusive of read only, programmable read only, random access, a hard drive, etc., whether local, remote or a combination of both. Likewise, to facilitate communications between the cloud-based server 50 and the individual EVs 10 and charging stations 12, the various nodes collectively used to establish the cloud-based server 50 and the various EVs 10 are equipped with or in communication with radio transceivers operable for remotely transmitting and receiving information when performing the present method.

Referring to FIG. 2, the method 100 for dynamically matching an energy demand of a population or fleet of the EVs 10 with an energy supply of a population of charging stations 12 within the geofenced perimeter 14, 140 of FIG. 1 commences with block B102 with receiving, via the cloud-based server 50, a set of EV information from each respective one of the EVs 10, and then generating an EV SoC map ("EV SoC-M") using the received EV information. That is, each individual EV 10 shown in FIG. 1 uploads its current SoC to the cloud-based server 50 of FIG. 2, e.g., continuously or at regularly scheduled intervals. The uploaded information includes the current GPS location of the EV 10 and its present SoC, with such information being time-stamped to maintain an accurate data record.

As part of block B102, the cloud-based server 50 receives the various SoCs and constructs the noted SoC map. As contemplated herein, the SoC map may be a data file of current locations and SoCs of the EVs 10 located within or traveling through the geofenced perimeter 14, 140 of FIG. 1. In other words, the cloud-based server 50 of FIG. 2 is made aware of the current SoCs of the various EVs 10, and thus the potential total energy demand within an area demarcated by the geofenced perimeter 14, 140 of FIG. 1. The method 100 proceeds to block B104 after constructing the EV SoC map.

Block B103 includes receiving, via the cloud-based server 50, a set of charging station information from each respective one of the charging stations 12 and generating an EVSE charging station power map ("CS-M") using the charging station information, as a counterpart to the above-described EV SoC map constructed in block B102. That is, the various charging stations 12 of FIG. 1 within the geofenced perimeter 14, 140 report their respective GPS location, current load (specific chargers in use), relative station use level (e.g., not busy, normally busy, very busy), predicted time slot availability, and estimated time to charge. The information in this charging station power map is communicated to a dynamic matching node ("DMM") of the cloud-based server 50 for further processing at block B106.

At block B104, a demand prediction model ("DPM") of the cloud-based server 50 may receive contextual information from one or more available sources 52. As contemplated herein, "contextual information" may include weather conditions, vehicle type (manufacturer, model, year, etc.), battery temperature and age, and/or charging system types and ages. Such data may be provided by the individual EVs 10 of FIG. 1 as part of the uploaded data noted above. Additionally, block B104 includes receiving the above-described charging station power map from block B103.

The method 100 as contemplated herein includes predicting the energy supply and the energy demand within the geofenced area 14, 140 via the cloud-based server 50 using the SoC map and the charging station power map. Demand prediction occurs for the area defined by the geofenced perimeter 14, 140, e.g., using machine learning as exemplified below. Outputs from block B104 may include a predicted number of charging stations 12 needed at a future time point, i.e., $C_{t:\ t+T}$, and a predicted charging demand at the future time point, i.e., $D_{t:\ t+T}$, as described in further detail below.

Block B106 of FIG. 2 includes dynamically matching a given EV 10 of FIG. 1 to a list of charging stations 12 based on the predicted values from block B104. This action is performed using the predicted energy demand from block B104 and the predicted energy supply from block B103, with possible implementations for dynamic matching set forth below with reference to FIG. 4. Outputs from block B106 may include ranked recommended bi-directional matches for a given EV 10, which may occur in a customized manner based on a personalized user profile in one or more embodiments. Multi-objective optimization such as utility maximization, e.g., using a weighting scheme or preference information, and/or a tradeoff Pareto optimization, may also be used to perform the functions of block B106 as set forth below.

Figure 3:
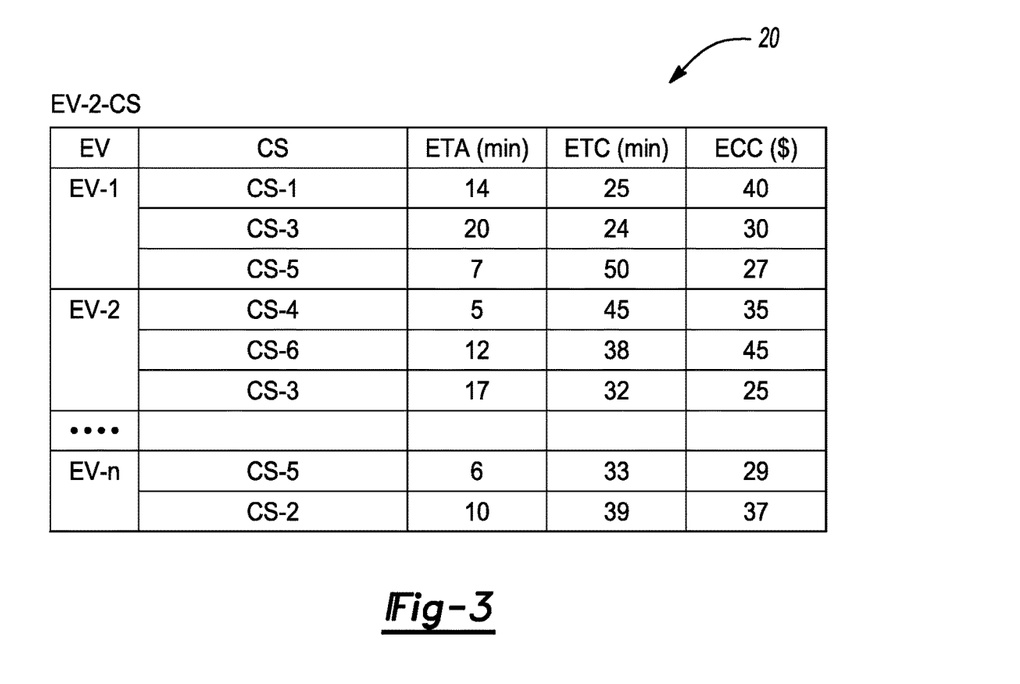
FIGS. 3 and 4 are representative matching tables describing outputs of the method of FIG. 2.

As shown in FIG. 3, an exemplary output of block B106 is a matched results table 20 ("EC-2-CS") in which the EVs 10 of FIG. 1, nominally EV-1, EV-2, . . . , EV-n, are matched to one or more of the available charging stations 12, nominally CS-1, CS-2, . . . , CS-6 in this particular non-limiting example. Also included in the matched results table 20 is an estimated time of arrival (ETA) at the particular charging station 12 stated in minutes (min), an estimated time to charge (ETC) likewise stated in minutes, and an estimated cost to charge (ECC) stated in U.S. dollars ($). Thus, a driver of an EV 10 nominally identified as "EV-1" might value arrival time and charging time over charging cost, and thus may prefer use of the charging station 12 identified as CS-1, while a cost-conscious operator unconcerned with charging time would likely opt for charging station CS-5. Moreover, an app-based approach could automatically decide for the user based on previously entered or machine-learned behavior, with the displayed order in FIG. 3 being adjusted based on such a personalized cloud profile. For example, a user might routinely select lowest cost, while another user, perhaps of the same EV 10, might prefer shortest charging duration, and thus the displayed order could change based on the identity of the user.

Figure 4:
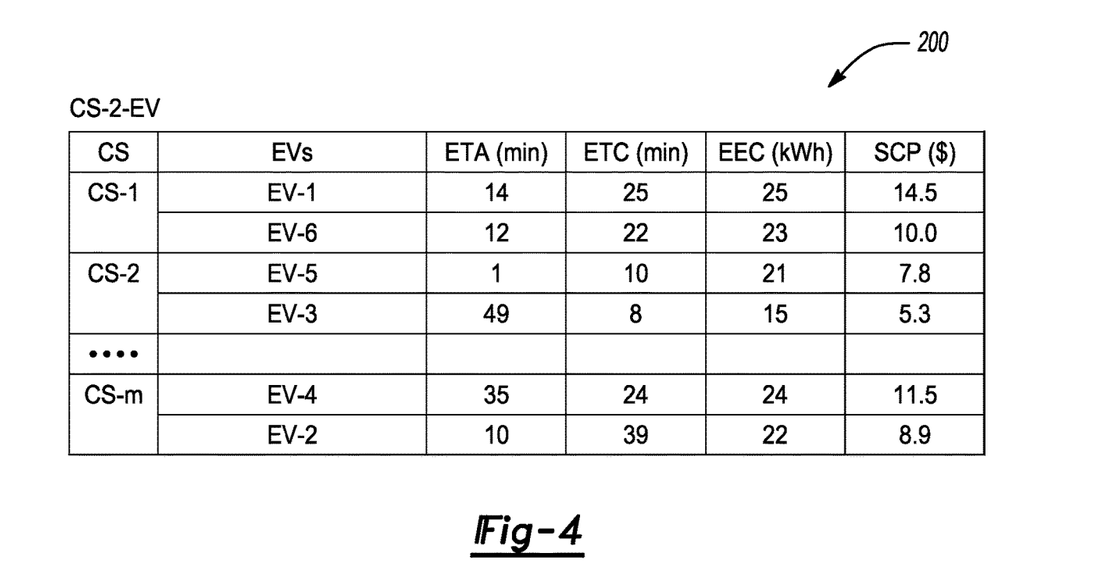

FIG. 4 depicts another matched results table 200 ("CS-2-EV") in which a given charging station 12 is matched to a given EV 10, with the charging station 12 being the recipient of the matched results table 200 in this instance. As FIG. 4 is from the perspective of the charging station 12, i.e., the energy supply side within the geofenced perimeter 14, 140, ETA and ETC are retained from FIG. 3, but ECC is replaced with estimated expected charge (EEC) in kilowatt hours (kWh) and expected charging station profit (SCP), again stated in U.S. dollars ($) in this non-limiting example. As with FIG. 3, the matched results table 200 of FIG. 4 provides a rank-ordered recommendation to the various charging stations as to how to prioritize prospective EV charging events based on a multi-objective optimization.

Turning back to FIG. 2, block B106 in particular performs the above bi-directional matching function in the course of performing the present method 100. The method 100 thus includes dynamically assigning or matching the EVs 10 to at least one of the charging stations 12 using a reward function, the predicted energy supply, and the predicted energy demand. An action is then executed by the cloud-based server 50, possibly including generating a rank-ordered listing for each respective one of the EVs 10 and/or each respective one of the charging stations 12 in a manner that maximizes an expected discounted future reward.

In general, block B106 of FIG. 2 receives a set of observations, denoted hereinbelow as EV states ($v_t$) and charging station states ($c_t$) for simplicity. Block B106 then performs an action ($a_t$), in this case by ranking recommended bi-directional matches, with two examples shown in FIGS. 3 and 4. Block B106 likewise outputs a reward ($r_t$), e.g., in terms of ETA, ETC, ECC, EEC, and/or SCP, as likewise depicted in FIGS. 3 and 4. The problem solved by the cloud-based server 50 in the course of executing the method 100 is thus one of maximizing an optimization function having multiple objectives, which may occur in some embodiments via reinforcement learning.

Data-driven Optimal Demand-Supply Matching for EV Charging: a possible approach for performing block B106 of FIG. 2 defines state variables as follows:

$v_t = \{v_{t,1}, v_{t,2}, \ldots, v_{t,N}\}$: the EV status at time t, where $v_{t,i}$ is a vector which consists of the current GPS location (latitude and longitude) of a given EV 10, i.e., EV(i), and its SoC;

$c_t = \{c_{t,1}, c_{t,2}, \ldots, c_{t,M}\}$: the charging station 12 status at time (t), where $c_{t,k}$ is a vector which consists of the GPS location (latitude and longitude) of the charging station (k), current load (chargers in use), crowd level (not busy, busy, too busy), predicted time slot availability and estimated time of charge. Given a set of charging requests at time (t), the cloud server can predict the number of charging stations $C_{t:\,t+T}$ that will be needed in each geofenced area for T time slots ahead.

$D_{t:T} = \{\bar{d}_t, \ldots, \bar{d}_{t+T}\}$: the predicted future charging demand from time t to t+ts in each geofenced perimeter 14, 140.

$s_t = \{V_t, C_{t:\,t+T}, D_{t:\,t+T}\}$: the environment state at time (t).

An objective of the cloud-based server 50 is to efficiently assign an EV 10 of FIG. 1 to a charging station 12 with a certain geofenced AOI. To do this, the cloud-based server 50 considers ETA, ETC, ECC, EEC, and SCP as competing objectives, with the constraint of "satisfy all charging demands" of the various EVs 10 located within the geofenced area. Thus, a combined reward value ($r_t$) across an area defined by the geofenced perimeter 14, 140 may be expressed mathematically as a weighted function of the rewards:

$r_t = \omega_{scp} \times SCP - \omega_{eta} \times ETA - \omega_{etc} \times ETC - \omega_{ecc} \times ECC$ with the various weighting terms $\omega_{scp}$, $\omega_{eta}$, $\omega_{etc}$, and $\omega_{ecc}$ reflecting a level of importance of each criterion, summing to 1 without a loss of generality.

Due to the conflicting nature between objective functions, duality is used to convert minimization (ETA, ETC, and ECC) into maximization to form the overall reward. At each time step (t), that is, the dynamic matching function performed at block B106 obtains a representation of the environment, $s_{at}$, and a reward, $r_t$. Based on this information, an action $a_t$ is taken to direct EVs 10 to charging stations 12 such that the expected discounted future reward is maximized, i.e.:

$$\max\; a_t \sum_{j=1}^{\infty} \gamma^{j-1} r_j(a_t, s_t)$$

where $0 < \gamma < 1$ is a time discounting factor providing a penalty to uncertainty of future awards. The cloud-based server 50 may then maximize the expected discounted future reward. This preference-based multi-objective optimization procedure involves having a preference vector or a weighting scheme that is highly subjective. Pareto optimization as appreciated in the art may also be used to find multiple tradeoff solutions and choose one using higher-level information from the user.

Figure 5:
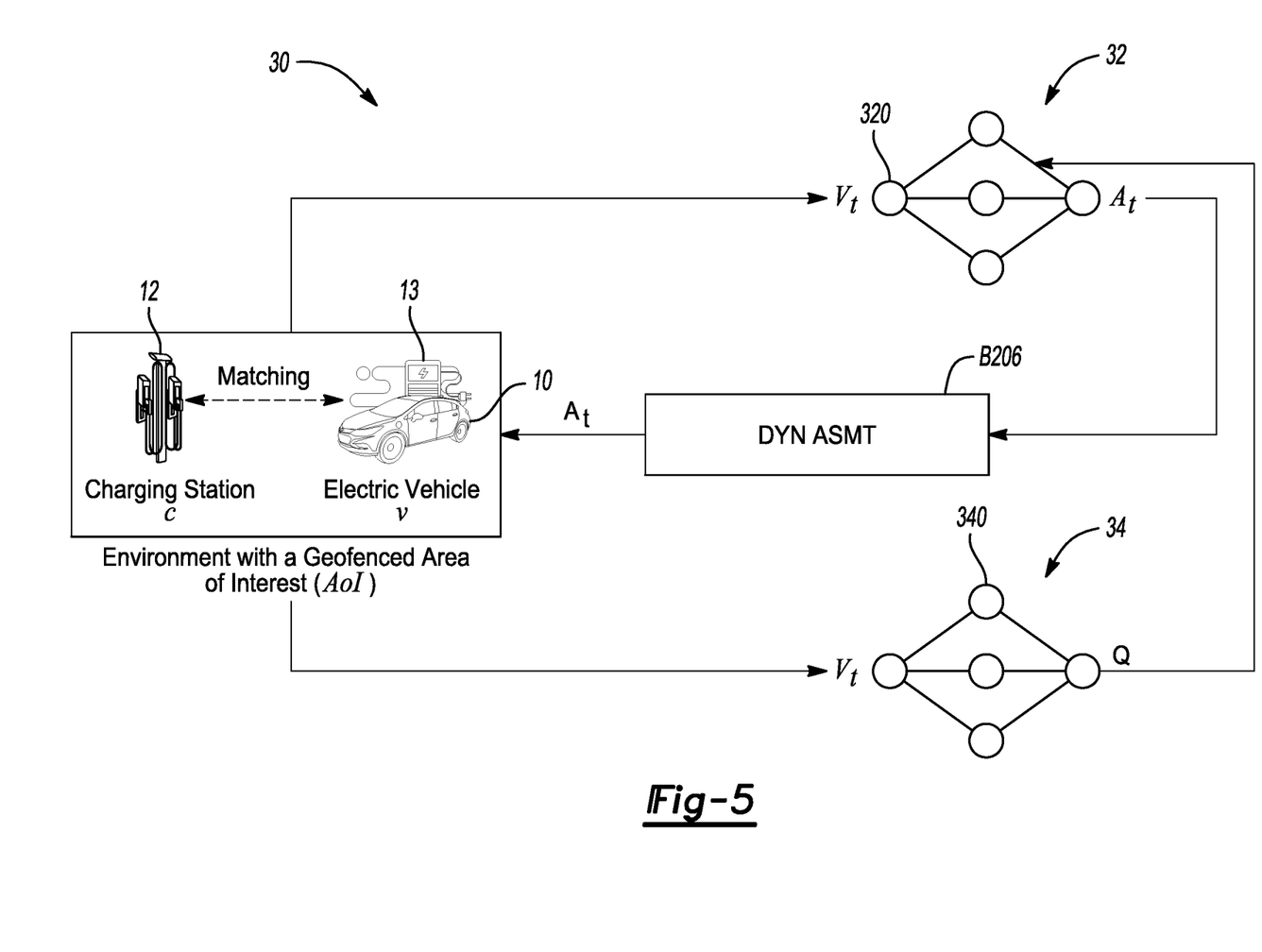
FIG. 5 depicts a representative dynamic assignment process that is usable within the context of the present method.

Referring briefly to FIG. 5, the method 100 of the present disclosure may use a temporal difference (TD) model-free on-policy learning algorithm such as asynchronous Advantage Actor-Critic (A3C) to learn an optimal action ($A_t$) to take given a current state ($V_t$) in such a way that the reward is maximized. Dynamic assignment (DYN ASMT) occurs at block B206 to produce the action $A_t$, which is analogous to block B106 as described above. As appreciated in the art, TD learning refers to a class of model-free reinforcement learning in which a machine "learns" by bootstrapping from a current estimate of a given value function. Such a technique may include a global actor-critic neural network 30 along with many local actor-critic networks, with an actor network 32 and a critic network 34 shown in FIG. 5 for simplicity. In such a network 30, the "actor" nodes 320 decide on a particular action to take, while the "critic" nodes 340 inform the actor nodes 320 how optimal or suitable the action was, and how to adjust. In this framework, the "critic" nodes 340 learn the value function, i.e., the environmental state ($s_{tp}$) at time (t), while multiple "actor" nodes 320 are trained in parallel, in this case by observing the environmental state ($s_{et}$), and are synchronized with global parameters from time to time.

Pointer Networks (Ptr-Net)-based Convex Hull Dynamic Geofence: the present teachings may be applied to the fixed static geofenced perimeter 14 of FIG. 1 or the elastic dynamic geofenced perimeter 140. For instance, the method 100 described herein may include using a pointer network to define the geofenced perimeter 140 as a convex hull or minimum convex polygon as shown. Some implementations may use a neural network to include all charging stations 12 and EVs 10 within the polygon, keeping reported EVs 10 and charging stations 12 within the geofence perimeter 140. As appreciated by those skilled in the art, such a pointer network may be defined as follows:

Input: a sequence of vectors $x = (X_1, \ldots, x_n)$

Ptr-Net Outputs: a sequence of integer indices, $c = (c_1, \ldots, c_m)$ and $1 \geq c_i \geq n$.

Encoder hidden states: $(h_i, \ldots, h_n)$

Decoder hidden states: $(s_i, \ldots, s_m)$ where $s_i$ is the output gate after cell activation in the decoder.

The Ptr-Net applies additive attention between states and then normalizes by the softmax function to model the output conditional probability:

$$y_i = p(c_i | c_1, \ldots, x) = \text{softmax}(\text{score}(s_t, h_i)) = \text{softmax}(v_a^T \tan h(W_a[s_t; h_i]))$$

Asynchronous Advantage Actor-Critic (A3C): as understood in the art, the following symbols are commonly used in the above-noted A3C algorithm:

| SYMBOL | MEANING |
|---|---|
| $s \in S$ | States $s_t = \{V_t, C_{t:t+T}, D_{t:t+T}\}$ |
| $a \in A$ | Actions (e.g., serving EV1 and EV3 using CS-2; EV2 and EV4 using CS-1) |
| $r \in R$ | Rewards |
| $s_t, a_t, r_t$ | State, action, and reward at time step (t) of one iteration |
| $\gamma$ | Discount factor; penalty to uncertainty of future rewards; $0 < \gamma < 1$ |
| $\pi_\theta(a\|s)$ | Stochastic policy (dynamic assignment strategy); probability of action (a) in state (s) given parameters ($\theta$) |
| $\theta$ | Policy parameter vector |
| $\omega$ | Function approximation parameter |
| $Q_\theta(a\|s)$ | Value of (state, action) pair when following policy $\pi$ parameterized by $\theta$ |
| $V_\omega(s)$ | Value of state s when following policy $\pi$ parameterized by $\omega$ |
| $A_\theta(a\|s)$ | Advantage function $A_\theta(a\|s) = Q_\theta(a\|s) - V_\omega(s)$ |

Exemplary A3C pseudocode appears as follows:
Initialize randomly the global parameter vectors $\theta$ and $\omega$;
Initialize the counter T with value 1;
while $T < T_{max}$ do
   Reset gradient $d_\theta \leftarrow 0$, $d_\omega \leftarrow 0$
   Synchronize local parameters $\hat{\theta}$, $\hat{\omega}$ with global parameters $\theta$ and $\omega$; $\hat{\theta} \leftarrow \theta$ and $\hat{\omega} \leftarrow \omega$
   While $t < t_{max}$ or $\acute{s}$ is not terminal do
     Pick the action $a_t \leftarrow \pi_\theta(a, s)$ and find the corresponding state $s_{t+1}$ and reward $r_t$;
   If $\acute{s}$ is terminal then
   The variable R is equal to $r_t$;
   Else
     The variable R is updated according to $R \leftarrow r_{t+} \gamma R$
   End
   Accumulate the policy gradient with respect to $\theta$:

$$d\theta \leftarrow d\theta + \nabla_{\hat{\theta}} \log(\pi_{\hat{\theta}}(a,s))(R - V_{\hat{\omega}}(s))$$

Accumulate the policy gradient with respect to $\hat{\omega}$:

$$d\omega \leftarrow d\omega + 2\nabla_{\hat{\omega}}(R - V_{\hat{\omega}}(s))(R - V_{\hat{\omega}}(s))$$

Make the state s equal to the new state $s_{t+1}$ and increment t by 1;
   End
   Update asynchronously global $\theta$ and $\omega$ using $d\theta$ and $d\omega$;
   Increment the variable T by 1
End The above-described solutions provide systems and methods for optimized dynamic bidirectional matching of multiple demands of charging EVs 10 with available power supplies of multiple charging stations 12, as shown in FIG. 1. The cloud-based solutions create SoC maps and power maps from the EVs 10 and charging stations 12, respectively, based on information collected from connected EVs 10 and connected charging stations 12 within a specific static geofence or elastic dynamic geofence, with both approaches shown in the various Figures.

As will be appreciated by those skilled in the art, the present disclosure provides a data-driven demand prediction approach to matching supply and demand within the geofenced area. Optimal matching between EV demand and charging station supply uses a temporal difference model-free on-policy learning algorithm, e.g., A3C, to learn the optimal pairings of EVs 10 and charging stations 12 within the geofenced area. A reward is thus obtained for each time step. The cloud-based server 50 then executes an action to match the EVs 10 with charging stations 12 such that the expected discounted future reward is maximized. Taken as a whole, the proposed solutions are intended to help reduce range anxiety and enable optimal charge scheduling from the perspective of the various EV drivers as well as charging station/infrastructure operators. These and other attendant benefits will be appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for matching, in real time, a dynamically changing energy demand of a plurality of electric vehicles (EVs) with a dynamically changing energy supply of a plurality of charging stations within a geofenced perimeter, the method comprising:
   establishing the geofenced perimeter;
   receiving telematics data, via a cloud-based server, as a set of EV information from each respective one of the EVs, the set of EV information including an uploaded current GPS location and an uploaded present state of charge (SoC) of each respective one of the EVs that are located in or traveling through the geofenced perimeter;
   receiving, via the cloud-based server, as a set of charging station information from each respective one of the charging stations, the set of charging information including an uploaded current GPS location, current load, relative station use level, predicted time slot availability, and estimated time to charge of each respective charging station in the plurality of charging stations;
   generating a state of charge (SoC) map and a charging station power map from the set of EV information and the set of charging station information, respectively, via the cloud-based server;
   predicting the dynamically changing energy supply and the dynamically changing energy demand within the geofenced perimeter as a predicted energy supply and a predicted energy demand, respectively, via the cloud-based server using the SoC map and the charging station power map, including determining a potential total energy demand of the EVs located within the geofenced perimeter;
   dynamically matching the EVs to at least one of the charging stations in the geofenced perimeter using (i) a reward function, (ii) the predicted energy supply within the geofenced perimeter, and (iii) the predicted energy demand within the geofenced perimeter, including generating a rank-ordered listing for each respective one of the EVs and/or each respective one of the charging stations to thereby maximize an expected discounted future reward; and adaptively routing each respective one of the EVs to the respective one of the charging stations.

2. The method of claim 1, wherein the geofenced perimeter is a dynamically-adjustable polygon, further comprising using a pointer network to define the geofenced perimeter as a convex hull or minimum convex polygon.

3. The method of claim 1, wherein dynamically matching the EVs to at least one of the charging stations includes generating a table of ranked bidirectional matches, the table having a plurality of rewards including an estimated time of arrival (ETA) and an estimated time to charge (ETC) at a respective one of the charging stations.

4. The method of claim 3, wherein the plurality of rewards includes one or more of an estimated cost of charge (ECC), an estimated expected charge (ECC), or an estimated charging station profit (SCP).

5. The method of claim 3, wherein dynamically matching the EVs to at least one of the charging stations includes calculating a combined reward value as a weighted function of the rewards, and maximizing the combined reward value across an area defined by the geofenced perimeter.

6. The method of claim 5, wherein maximizing the combined reward value includes using Pareto optimization.

7. The method of claim 6, wherein dynamically matching the EVs to at least one of the charging stations includes performing a temporal difference (TD) model-free on-policy learning algorithm.

8. The method of claim 7, wherein the TD model-free on-policy learning algorithm includes Advantage Actor-Critic (A3C).

9. The method of claim 1, further comprising:
receiving, via the cloud-based server, contextual information characterizing a vehicle type, a battery temperature, a battery age, a charging type, and local weather conditions for each respective one of the EVs, and a charging type and local weather conditions for each respective one of the charging stations.

10. A cloud-based server comprising:
a processor; and
a computer-readable storage medium on which is recorded instructions executable by the processor, wherein executing the instructions causes the processor to match, in real time, a dynamically changing energy demand of a plurality of electric vehicles (EVs) with a dynamically changing energy supply of a plurality of charging stations within a geofenced perimeter by:
establishing the geofenced perimeter;
receiving telematics data, as a set of EV information, from each respective one of the EVs located in the geofenced perimeter, the set of EV information including an uploaded current GPS location and an uploaded present state of charge (SoC) of each respective one of the EVs that are located in or traveling through the geofenced perimeter;
receiving a set of charging station information from each respective one of the charging stations in the geofenced perimeter, the set of charging information including an uploaded current GPS location, current load, relative station use level, predicted time slot availability, and estimated time to charge;
generating a state of charge (SoC) map and a charging station power map from the set of EV information and the set of charging station information, respectively;

predicting the dynamically changing energy supply and the dynamically changing energy demand within the geofenced perimeter as a predicted energy supply and a predicted energy demand, respectively, via the cloud-based server using the SoC map and the charging station power map, including determining a potential total energy demand of the EVs located within the geofenced perimeter;

dynamically matching the EVs to at least one of the charging stations using (i) a reward function, (ii) the predicted energy supply within the geofenced perimeter, and (iii) the predicted energy demand within the geofenced perimeter, including generating a rank-ordered listing for each respective one of the EVs and/or each respective one of the charging stations to thereby maximize an expected discounted future reward; and adaptively routing each respective one of the EVs to the respective one of the charging stations.

11. The cloud-based server of claim 10, further comprising using a pointer network to define the geofenced perimeter as a convex hull or minimum convex polygon.

12. The cloud-based server of claim 11, wherein dynamically matching the EVs to at least one of the charging stations includes performing a temporal difference (TD) model-free on-policy learning algorithm.

13. The cloud-based server of claim 12, wherein the TD model-free on-policy learning algorithm includes Advantage Actor-Critic (A3C).

14. The cloud-based server of claim 10, wherein dynamically matching the EVs to at least one of the charging stations includes generating a table of ranked bidirectional matches, the table having a plurality of rewards including an estimated time of arrival (ETA) and an estimated time to charge (ETC) at a respective one of the charging stations.

15. The cloud-based server of claim 12, wherein the plurality of rewards includes one or more of an estimated cost of charge (ECC), an estimated expected charge (ECC), or an estimated charging station profit (SCP).

16. The cloud-based server of claim 15, wherein dynamically matching the EVs to at least one of the charging stations includes calculating a combined reward value as a weighted function of the rewards, and maximizing the combined reward value across an area defined by the geofenced perimeter.

17. The cloud-based server of claim 16, wherein maximizing the combined reward value includes using Pareto optimization.

18. A method for matching, in real time, a dynamically changing energy demand of a plurality of electric vehicles (EVs) with a dynamically changing energy supply of a plurality of charging stations within a geofenced perimeter, the method comprising:
establishing the geofenced perimeter;
receiving telematics data, via a cloud-based server, as a set of EV information from each respective one of the EVs, the set of EV information including an uploaded current GPS location and an uploaded present state of charge (SoC) of each respective one of the EVs that are located in or traveling through the geofenced perimeter;
receiving, via the cloud-based server, a set of charging station information from each respective one of the charging stations, the set of charging information including an uploaded current GPS location, current load, relative station use level, predicted time slot availability, and estimated time to charge of each respective charging station in the plurality of charging stations;

using a pointer network to define the geofenced perimeter as a convex hull or minimum convex polygon;

generating a state of charge (SoC) map and a charging station power map from the set of EV information and the set of charging station information, respectively, via the cloud-based server;

predicting the dynamically changing energy supply and the dynamically changing energy demand within the geofenced perimeter as a predicted energy supply and a predicted energy demand, respectively, via the cloud-based server using the SoC map and the charging station power map, including determining a potential total energy demand of the EVs located within the geofenced perimeter;

dynamically matching the EVs to at least one of the charging stations using (i) a reward function, (ii) the predicted energy supply within the geofenced perimeter, and (iii) the predicted energy demand within the geofenced perimeter, including generating a rank-ordered listing for each respective one of the EVs and/or each respective one of the charging stations as a table of ranked bidirectional matches to thereby maximize an expected discounted future reward, the table having a plurality of rewards including an estimated time of arrival (ETA) and an estimated time to charge (ETC) at a respective one of the charging stations and one or more of an estimated cost of charge (ECC), an estimated expected charge (ECC), or an estimated charging station profit (SCP); and adaptively routing each respective one of the EVs to the charging stations.

19. The method of claim 18, wherein dynamically matching the EVs to at least one of the charging stations includes:

calculating a combined reward value as a weighted function of the rewards;

maximizing the combined reward value across an area defined by the geofenced perimeter; and performing a temporal difference (TD) model-free on-policy learning algorithm.

20. The method of claim 18, further comprising:

receiving, via the cloud-based server, contextual information describing a vehicle type, a battery temperature, a battery age, a charging type, and local weather conditions for each respective one of the EVs, and a charging type and local weather conditions for each respective one of the charging stations.

* * * * *